(No Model.)

D. H. BURRELL.
Vat for Heating and Saturating Barrel Hoops.

No. 243,502. Patented June 28, 1881.

Attest:
F. H. Schott
A. R. Brown

Inventor:
David H. Burrell

UNITED STATES PATENT OFFICE.

DAVID H. BURRELL, OF LITTLE FALLS, NEW YORK.

VAT FOR HEATING AND SATURATING BARREL-HOOPS.

SPECIFICATION forming part of Letters Patent No. 243,502, dated June 28, 1881.

Application filed December 3, 1880. (No model.)

*To all whom it may concern:*

Be it known that I, DAVID H. BURRELL, a citizen of the United States, residing at Little Falls, in the county of Herkimer and State of New York, have invented certain new and useful Improvements in Water-Vats for Heating and Saturating Barrel-Hoops, Plank, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to water-vats wherein planks are boiled preparatory to cutting into barrel-hoops, and also for the immersion of dressed barrel-hoops in boiling water, so as to make them pliable before coiling; and it consists in the form and manner of construction that will be hereinafter fully described, the object of which is to provide for a more thorough and regular saturation. It is also adapted to the heating and soaking of logs, boards, plank, cheese-box hoops, veneers, and other materials.

Figure 2:
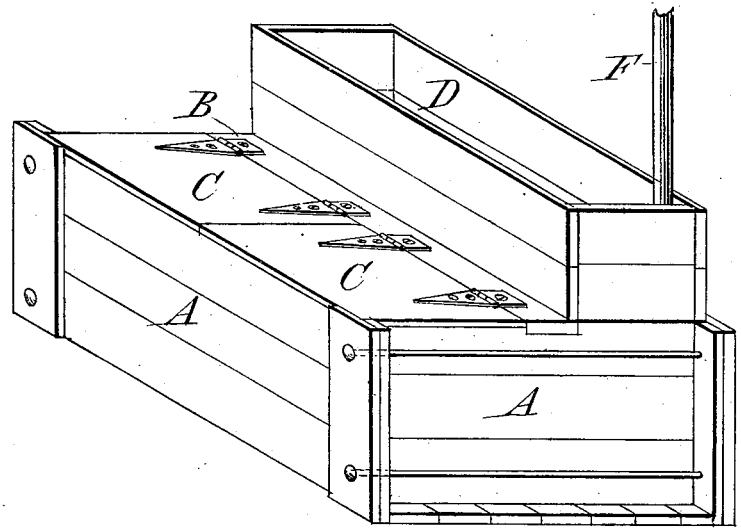
Figure 1:
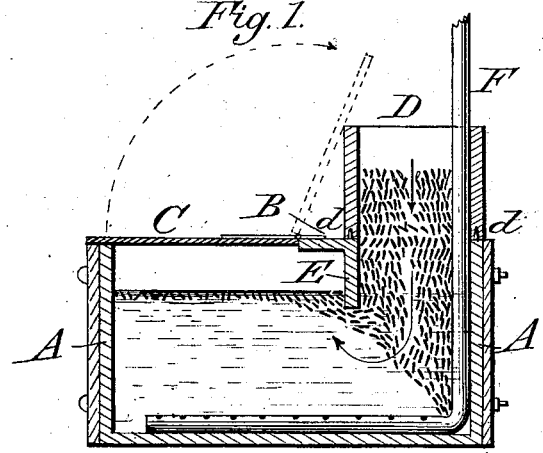

Referring to the drawings, Figure 1 is a transverse section, and Fig. 2 is an isometrical view.

A A represent the body of the vat, which is made water-tight, being made rectangular, and about thirty inches deep.

B is a cross-piece on which is hinged the double cover C C.

From the cross-piece and from the back of the body of the vat is the receptacle D for the planks or hoops. This receptacle can be loose or apart from the vat, and is preferably so made, being doweled onto vat at *d d*, but provision is made whereby it can be so tightened to it as to actually form a part of it.

E is a partition extending from the cross-piece down about eight or twelve inches. This extends the whole length of the vat, and is for the purpose of holding the column of hoops below the water-line.

All these parts aforenamed are firmly and well put together, so as to withstand the weight of the contents.

The cover C C is preferably made in two sections, as shown, for the reason that, being continually opened and closed, it is much easier on the operator, as he can take out the hoops by raising but one of the covers. This also prevents escape of steam.

In operation water is run into the vat A A, through the pipe F, until it reaches a few inches above the lowest part of the partition E. Steam is then admitted through the same pipe F, which causes the water to boil. Hoops are then put into the receptacle at D, and fall onto the surface of the water in the vat. As more are thrown in they force down the first ones put in until they get below the level of the partition E, and then they rise to the surface of the water on the other side, or underneath the cover C C, and are taken out to be coiled, being each and every one saturated and heated alike. By this arrangement the hoops are kept straight, and the device is automatic in its operation.

Having thus described my invention, what I claim as new, and desire to secure by Letters Patent, is—

1. The herein-described apparatus for heating and saturating barrel-hoops, planks, and other timber, consisting of the water-vat A, provided with receptacle D, partition E, pipe F, and covers C C, substantially as specified.

2. In a water-vat for heating and saturating hoops, planks, and other timber, the combination, with the vat A, having partition E, of the detachable receptacle D, secured to said vat, for the purpose of affording space to pack a column of material, substantially as specified.

3. In a water-vat for heating and saturating hoops or other similar material, the combination, with the vat A, receptacle D, and partition E, of the water and steam pipe F, substantially as specified.

In testimony whereof I affix my signature in presence of two witnesses.

DAVID H. BURRELL.

Witnesses:
WM. H. SPARKS,
MERRICH FREEMAN.